US012771173B2

(12) United States Patent
Bien et al.

(10) Patent No.: US 12,771,173 B2
(45) Date of Patent: Oct. 20, 2026

(54) METHOD AND SYSTEM FOR NON-CONTACT CHARGING USING PHASED ARRAY

(71) Applicant: UNIST (ULSAN NATIONAL INSTITUTE OF SCIENCE AND TECHNOLOGY), Ulsan (KR)

(72) Inventors: Franklin Bien, Ulsan (KR); Jungho Kim, Ulsan (KR); Hyunkyeong Jo, Ulsan (KR); Seoktae Seo, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 226 days.

(21) Appl. No.: 18/565,394

(22) PCT Filed: Nov. 28, 2023

(86) PCT No.: PCT/KR2023/019331
§ 371 (c)(1),
(2) Date: Nov. 29, 2023

(87) PCT Pub. No.: WO2024/147489
PCT Pub. Date: Jul. 11, 2024

(65) Prior Publication Data

US 2025/0105665 A1 Mar. 27, 2025

(30) Foreign Application Priority Data

Jan. 4, 2023 (KR) ........................ 10-2023-0001067

(51) Int. Cl.

| | |
|---|---|
| *H02J 50/00* | (2016.01) |
| *H02J 50/10* | (2016.01) |
| *H02J 50/90* | (2016.01) |

(52) U.S. Cl.
CPC ............ *H02J 50/005* (2020.01); *H02J 50/10* (2016.02); *H02J 50/90* (2016.02)

(58) Field of Classification Search
CPC .................................................... H02J 50/402
See application file for complete search history.

(56) References Cited

U.S. PATENT DOCUMENTS

2017/0093199 A1* 3/2017 Pinciuc .................. H02J 50/40
2017/0353061 A1 12/2017 Maniktala
(Continued)

FOREIGN PATENT DOCUMENTS

JP 2018524963 A1 8/2018
KR 1020170028504 3/2017
(Continued)

*Primary Examiner* — Daniel Kessie
(74) *Attorney, Agent, or Firm* — Hayes Soloway PC

(57) ABSTRACT

A contactless charging method and system using a phase array method are presented. The contactless charging system using a phase array method, which is proposed in the present disclosure, includes a transmission part having at least one horizontal wire and at least one vertical wire intersected therein in a cross form and disposed in an array form and not having a coil, at least one reception part including a coil that is disposed on the transmission part and for receiving a change in the magnetic field according to a location of an array of the transmission part, and a sensor part for recognizing the location of the array of the transmission part where the reception part is disposed.

11 Claims, 15 Drawing Sheets

(56) References Cited

U.S. PATENT DOCUMENTS

2019/0363578 A1* 11/2019 Hume ........................ H02J 7/04
2021/0078426 A1* 3/2021 Bhat ..................... B60L 53/122

FOREIGN PATENT DOCUMENTS

KR 10-2020-0052006 A 5/2020
KR 10-2119553 B1 6/2020
KR 10-2021-0151697 A 12/2021

* cited by examiner

METHOD AND SYSTEM FOR NON-CONTACT CHARGING USING PHASED ARRAY

CROSS-REFERENCE TO RELATED APPLICATIONS AND PRIORITY

This patent application claims priority from PCT application no. PCT/KR2023/019331 filed Nov. 28, 2023, which claims priority from Korean patent application no. 10-2023-0001067 filed Jan. 4, 2023.

TECHNICAL FIELD

The present disclosure relates to the contactless charging method and system using a phase array method.

BACKGROUND

Modern wireless power transfer has been subjected to many researches and developed in various fields compared to the past. In order to increase the distance, a 4-coil system [1] using a magnetic resonant method was introduced, and research for increasing a degree of freedom has also be performed [2]. In addition, various researches are carried out. Nevertheless, the technology has various problems so far.

In the wireless power transfer, installing a circular coil at all of possible places for a free arrangement is a very irrational choice. In order to solve such a problem, in this thesis, a place where a magnetic field according to the phase of a current is reinforced may be changed based on a reception part without an additional wire at the location of the reception part.

SUMMARY

An object of the present disclosure is to provide a contactless charging method and system using a phase array method, which are a new unit for a free arrangement. The best efficiency can be maintained regardless of the location of a reception part by detecting the location of the reception part by using straight-line wires without using a circular coil and setting the phase of a current.

In an aspect, a contactless charging system using a phase array method, which is proposed in the present disclosure, includes a transmission part having at least one horizontal wire and at least one vertical wire intersected therein in a cross form and disposed in an array form and not having a coil, at least one reception part including a coil that is disposed on the transmission part and for receiving a change in the magnetic field according to a location of an array of the transmission part, and a sensor part for recognizing the location of the array of the transmission part where the reception part is disposed.

The transmission part applies a change in the phase of a current that flows into the at least one horizontal wire and the at least one vertical wire that are intersected in the cross form based on a location of the reception part.

A magnetic flux density at a location of a corresponding array of the transmission part wherein the reception part is disposed is changed in response to a change in the phase of the current.

The transmission part adjusts a magnetic flux density at a location of a desired array through reinforcement interference between the at least one horizontal wire and the at least one vertical wire without an additional wire.

If two or more reception parts are disposed on the transmission part, when the two or more reception parts are disposed on different arrays of the transmission part and the different arrays are adjacent to each other, the transmission part activate a redundant wire of the arrays that are adjacent to each other so that a current flows into the redundant wire.

The transmission part deactivates a wire disposed within an area of one reception part so that a current does not flow into the wire when the area of the one reception part is greater than an area of one array of the transmission part.

The sensor part recognizes whether an object is present on the transmission part, recognizes whether the corresponding object is a reception part including a coil when the object is present on the transmission part, and recognizes a location of an array of the transmission part where the corresponding reception part is disposed when the object is the reception part so that the transmission part performs wireless power transfer (WPT).

When two or more reception parts are disposed on the transmission part, the sensor part recognizes the number of reception parts and a location of each of the reception parts so that the transmission part performs the WPT.

In another aspect, a contactless charging method using a phase array method, which is proposed in the present disclosure, includes recognizing, by a sensor part, whether an object is present on a transmission part having at least one horizontal wire and at least one vertical wire intersected therein in a cross form and disposed in an array form and not having a coil, recognizing, by the sensor part, whether the object is a reception part including a coil when the corresponding object is present on the transmission part, recognizing, by the sensor part, the number of corresponding reception parts when the object is the reception part, and recognizing, by the sensor part, a location of an array of the transmission part where each of the reception parts is disposed so that the transmission part performs wireless power transfer (WPT).

According to embodiments of the present disclosure, the best efficiency can be maintained regardless of the location of a reception part by detecting the location of the reception part by using straight-line wires without using a circular coil and setting the phase of a current through the contactless charging method and system using a phase array method, which are a new unit for a free arrangement.

DETAILED DESCRIPTIONS OF THE DRAWINGS

Hereinafter, embodiments of the present disclosure are described in detail with reference to the accompanying drawings.

Figure 1:
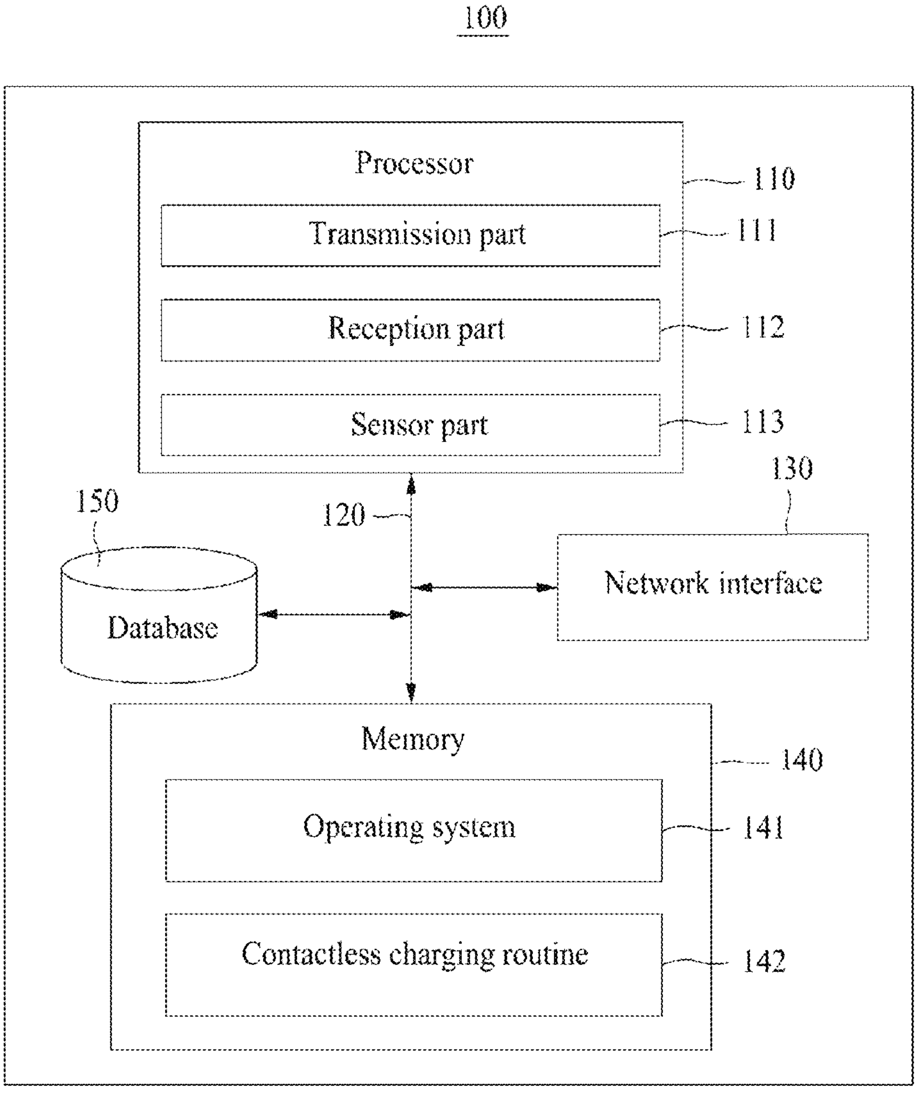
FIG. 1 is a diagram illustrating a construction of a contactless charging system using a phase array method according to an embodiment of the present disclosure.

FIG. 1 is a diagram illustrating a construction of a contactless charging system using a phase array method according to an embodiment of the present disclosure.

A contactless charging system 100 using a phase array method according to the present embodiment may include a processor 110, a bus 120, a network interface 130, memory 140, and a database 150. The memory 140 may include an operating system 141 and a contactless charging routine 142. The processor 110 may include a transmission part 111, a reception part 112, and a sensor part 113. In other embodiments, the contactless charging system 100 using a phase array method may include more components than the components of FIG. 1. However, most of conventional components do not need to be clearly illustrated. For example, the contactless charging system 100 using a phase array method may include other components, such as a display or a transceiver.

The memory 140 is a computer-readable recording medium, and may include permanent mass storage devices, such as random access memory (RAM), read only memory (ROM), and a disk drive. Furthermore, program codes for the operating system 141 and the contactless charging routine 142 may be stored in the memory 140. Such software components may be loaded onto a computer-readable recording medium separated from the memory 140 by using a drive mechanism (not illustrated). Such a separate computer-readable recording medium may include computer-readable recording media (not illustrated), such as a floppy drive, a disk, a tape, a DVD/CD-ROM drive, and a memory card. In another embodiment, the software components may be loaded onto the memory 140 through the network interface 130 not a computer-readable recording medium.

The bus 120 may enable communication and data transmission between the components of the contactless charging system 100 using a phase array method. The bus 120 may be constructed by using a high-speed serial bus, a parallel bus, a storage area network (SAN) and/or another proper communication technology.

The network interface 130 may be a computer hardware component for connecting the contactless charging system 100 using a phase array method to a computer network. The network interface 130 may connect the contactless charging system 100 using a phase array method to the computer network through a wireless or wired connection.

The database 150 may serve to store and maintain all pieces of information necessary for the contactless charging using a phase array method. FIG. 1 illustrates that the database 150 is constructed and included in the contactless charging system 100 using a phase array method, but the present disclosure is not limited thereto. The database 150 may be omitted depending on a system implementation method or an environment or some of or the entire database may also be present as an external database that is constructed on another separate system.

The processor 110 may be configured to process an instruction of a computer program by performing basic calculation, logic, and input and output operations of the contactless charging system 100 using a phase array method. The instruction may be provided to the processor 110 by the memory 140 or the network interface 130 and through the bus 120. The processor 110 may be configured to execute program codes for the transmission part 111, the reception part 112, and the sensor part 113. Such a program code may be stored in a recording device, such as the memory 140.

Figure 2:
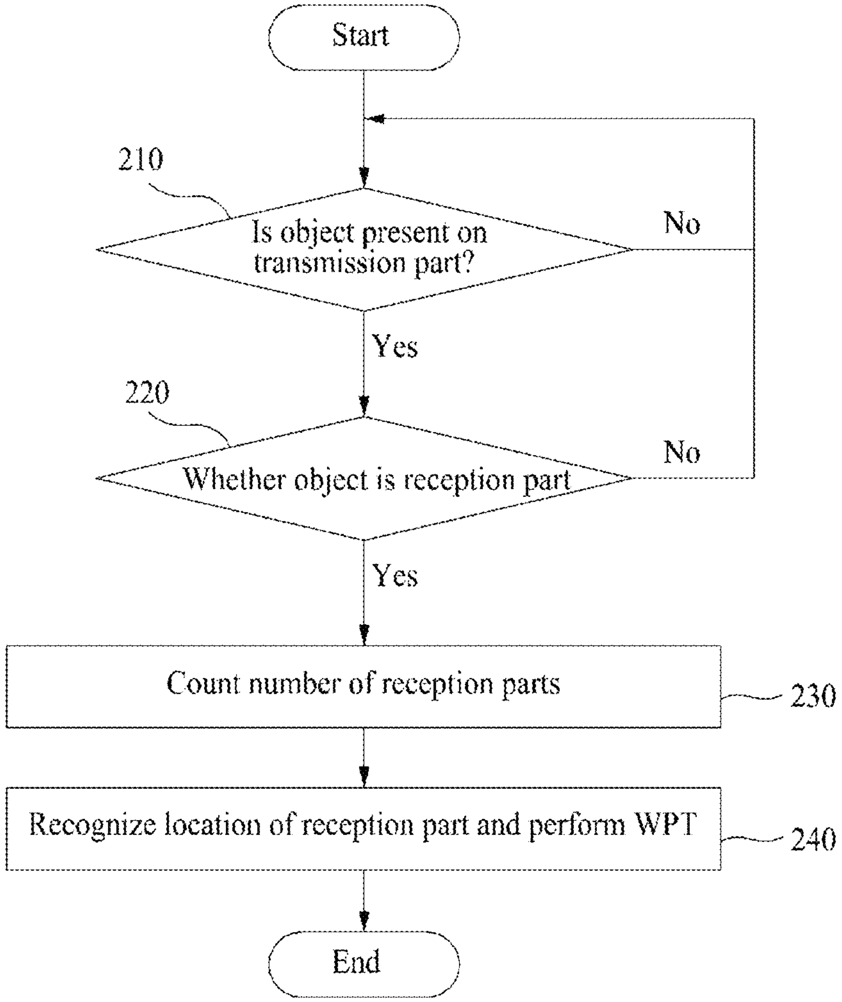
FIG. 2 is a flowchart for describing a contactless charging method using a phase array method according to an embodiment of the present disclosure.

The transmission part 111, the reception part 112, and the sensor part 113 may be configured to perform steps 210 to 240 of FIG. 2.

The contactless charging system 100 using a phase array method may include the transmission part 111, the reception part 112, and the sensor part 113.

The transmission part 111 according to an embodiment of the present disclosure may have at least one horizontal wire and at least one vertical wire intersected therein in a cross form and disposed in an array form, and does not have a form of a coil.

Installing a circular coil at all of possible places for a free arrangement of a reception part is a very irrational choice. In order to solve such a problem, in the present disclosure, a location where a magnetic field according to the phase of a current is reinforced may be changed based on a reception part without an additional wire at the location of the reception part. Accordingly, the reception part can be freely moved within a corresponding array of a transmission part.

The transmission part 111 according to an embodiment of the present disclosure applies a change in the phase of a current that flows into the at least one horizontal wire and the at least one vertical wire that are intersected in a cross form, based on the location of the reception part 112. In this case, a magnetic flux density at the location of a corresponding array of the transmission part 111 where the reception part 112 is disposed is changed in response to a change in the phase of the current.

The transmission part 111 according to an embodiment of the present disclosure adjusts a magnetic flux density at the location of a desired array through reinforcement interference between the at least one horizontal wire and the at least one vertical wire without an additional wire.

The transmission part 111 according to an embodiment of the present disclosure may control the phase of a current according to the location of the reception part by using coil detection.

If two or more reception parts are disposed on the transmission part 111, when the two or more reception parts are disposed on different arrays of the transmission part 111 and the different arrays are adjacent to each other, the transmission part 111 according to an embodiment of the present disclosure activates a redundant wire so that a current flows into the redundant wire of the arrays that are adjacent to each other.

If the area of one reception part is greater than the area of one array of the transmission part 111, the transmission part 111 according to an embodiment of the present disclosure deactivates the array so that a current does not flow into a wire disposed within the area of the reception part.

The reception part 112 according to an embodiment of the present disclosure includes a coil that is disposed on the transmission part 111 and for receiving a change in the magnetic field according to the location of an array of the transmission part 111. The number of coils may be at least one.

The sensor part 113 according to an embodiment of the present disclosure recognizes the location of an array of the transmission part 111 where the reception part 112 is disposed.

The sensor part 113 according to an embodiment of the present disclosure recognizes whether an object is present on the transmission part 111, and recognizes whether the corresponding object is the reception part 112 including a coil when the object is present on the transmission part 111. When the object is the reception part 112, the sensor part recognizes the location of an array of the transmission part 111 where the corresponding reception part 112 is disposed so that the transmission part 111 performs wireless power transfer (WPT).

If two or more reception parts 112 are disposed on the transmission part 111, the sensor part 113 according to an embodiment of the present disclosure recognizes the number of reception parts and the location of each of the reception parts so that the transmission part 111 performs WPT.

FIG. 2 is a flowchart for describing a contactless charging method using a phase array method according to an embodiment of the present disclosure.

The proposed contactless charging method using a phase array method includes step 210 of recognizing, by the sensor part, whether an object is present on the transmission part in which at least one horizontal wire and at least one vertical wire are intersected in a cross form and disposed in an array form and that does not a coil, step 220 of recognizing, by the sensor part, whether the corresponding object is a reception part including a coil when the object is present on the transmission part, step 230 of recognizing, by the sensor part, the number of corresponding reception parts when the object is the reception part, and step 240 of recognizing, by the sensor part, the location of an array of the transmission part where each of the reception parts is disposed so that the transmission part performs wireless power transfer (WPT).

In step 210, the sensor part recognizes whether an object is present on the transmission part in which at least one horizontal wire and at least one vertical wire are intersected in a cross form and disposed in an array form and that does not a coil.

The transmission part according to an embodiment of the present disclosure has the at least one horizontal wire and the at least one vertical wire intersected therein in a cross form and disposed in an array form, and does not have a form of a coil.

In step 220, when the object is present on the transmission part, the sensor part recognizes whether the corresponding object is a reception part including a coil.

The reception part according to an embodiment of the present disclosure includes a coil that is disposed on the transmission part and for receiving a change in the magnetic field according to the location of an array of the transmission part. The number of coils may be at least one.

In step 230, when the object is the reception part, the sensor part recognizes the number of corresponding reception parts.

In step 240, the sensor part recognizes the location of the array of the transmission part where each of the reception parts is disposed so that the transmission part performs wireless power transfer (WPT).

When two or more reception parts are disposed on the transmission part, the sensor part according to an embodiment of the present disclosure recognizes the number of reception parts and the location of each of the reception parts so that the transmission part performs WPT.

The transmission part according to an embodiment of the present disclosure applies a change in the phase of a current that flows into the at least one horizontal wire and the at least one vertical wire that are intersected in a cross form based on the location of the reception part. Accordingly, a magnetic flux density at the location of the corresponding array of the transmission part where the reception part is disposed is changed in response to a change in the phase of the current.

The transmission part according to an embodiment of the present disclosure adjusts the magnetic flux density at the location of a desired array through reinforcement interference between the at least one horizontal wire and the at least one vertical wire without an additional wire.

If two or more reception parts are disposed on the transmission part, when the two or more reception parts are disposed on different arrays of the transmission part and the different arrays are adjacent to each other, the transmission part according to an embodiment of the present disclosure activates a redundant wire so that a current flows into the redundant wire of the arrays that are adjacent to each other.

When the area of one reception part is greater than the area of one array of the transmission part, the transmission part according to an embodiment of the present disclosure deactivates the array so that a current does not flow into a wire disposed within the area of the reception part.

Figure 3A:
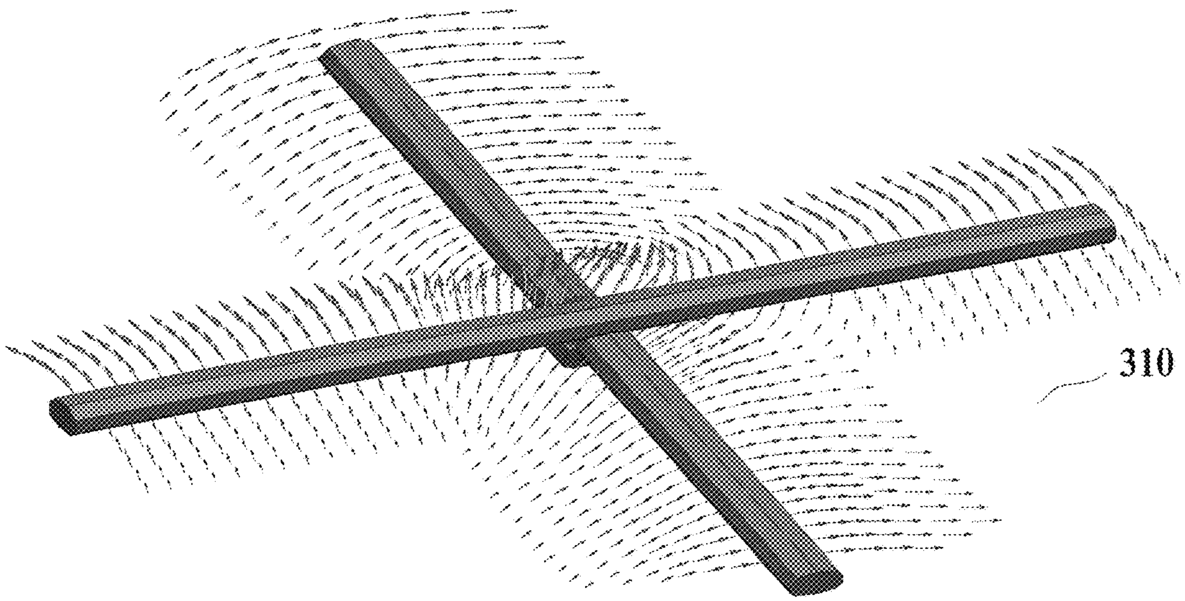
FIGS. 3A and 3B are diagrams for describing transmission parts that are intersected in a cross form without a coil according to an embodiment of the present disclosure.
Figure 3B:
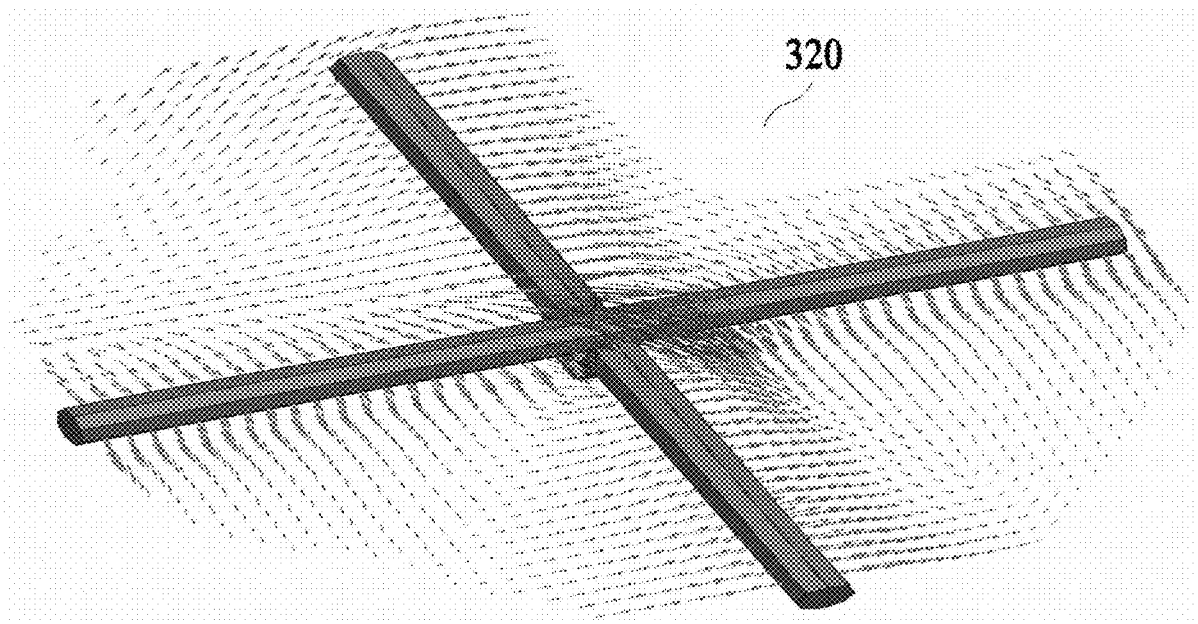

FIGS. 3A and 3B are diagrams for describing transmission parts that are intersected in a cross form without a coil according to an embodiment of the present disclosure.

FIG. 3A is a diagram illustrating a magnetic field when the reception part is disposed on a right bottom 310 thereof. FIG. 3B is a diagram illustrating a magnetic field when the reception part is disposed on a right top 320.

A basic unit of a system that is manufactured without using a circular coil basically has a cross form as in FIGS. 3A and 3B. Such a unit form may be divided into four spaces. The strength of a current at a desired place can be adjusted through reinforcement interference between wires without an additional wire by applying a change in the phase of the current based on the location of the reception part. A large area can be constructed by continuously repeating such a structure.

Assuming a case in which the reception part was disposed on the right bottom 310 (FIG. 3A), a magnetic field that was generated by two straight-line wires was reinforced at the location of the reception part through simulations. If the reception part was moved and disposed on the right top 320 (FIG. 3B), a changed magnetic field was reinforced at the changed reception part by applying a change in the phase of the current.

Figure 4:
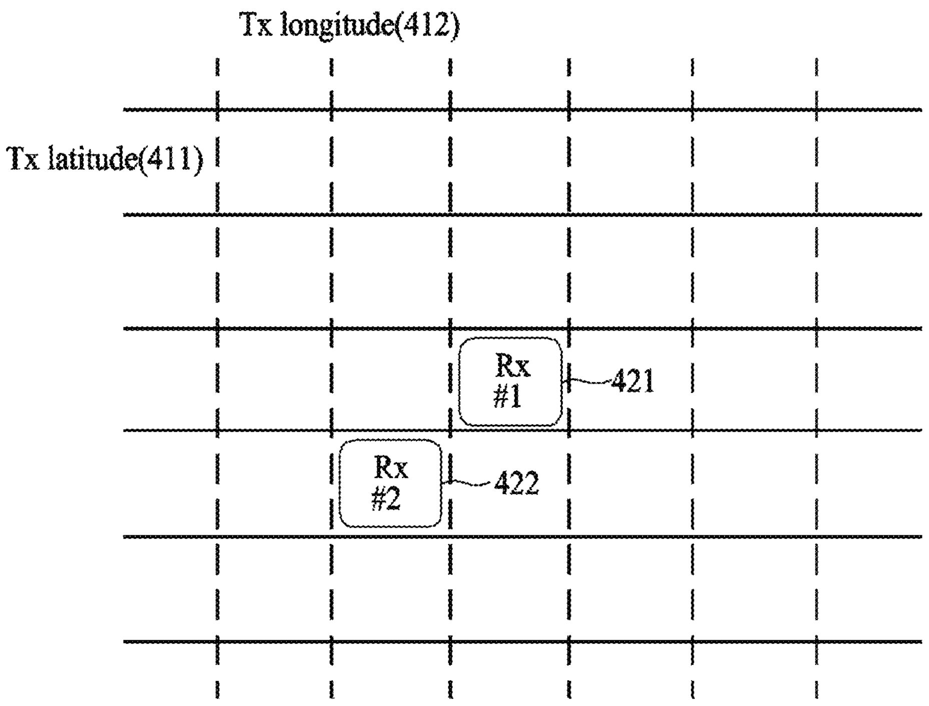
FIG. 4 is a diagram for describing a transmission part that does not have a coil and has an array form according to an embodiment of the present disclosure.

FIG. 4 is a diagram for describing a transmission part that does not have a coil and has an array form according to an embodiment of the present disclosure.

The transmission part according to an embodiment of the present disclosure has at least one horizontal wire 411 and at least one vertical wire 412 intersected therein in a cross form and disposed in an array form, and does not have a form of a coil.

The transmission part according to an embodiment of the present disclosure applies a change in the phase of a current that flows into the at least one horizontal wire and the at least one vertical wire that are intersected in a cross form based on the locations of reception parts 421 and 422. In this case, a magnetic flux density at the location of a corresponding array of the transmission part where the reception parts 421 and 422 are disposed is changed in response to a change in the phase of the current.

The transmission part according to an embodiment of the present disclosure adjusts the magnetic flux density at the location of a desired array through reinforcement interference between the at least one horizontal wire and the at least one vertical wire without an additional wire.

Figure 5A:
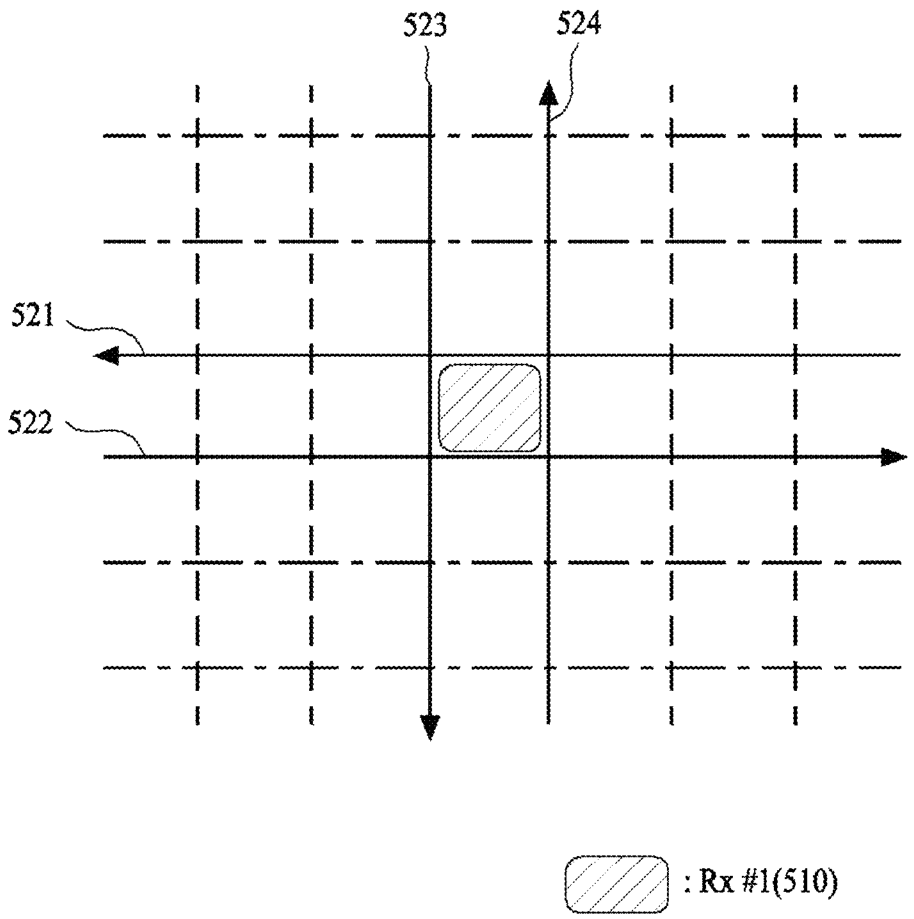
FIGS. 5A and 5B are diagrams for describing one reception part that is disposed on a transmission part according to an embodiment of the present disclosure.
Figure 5B:
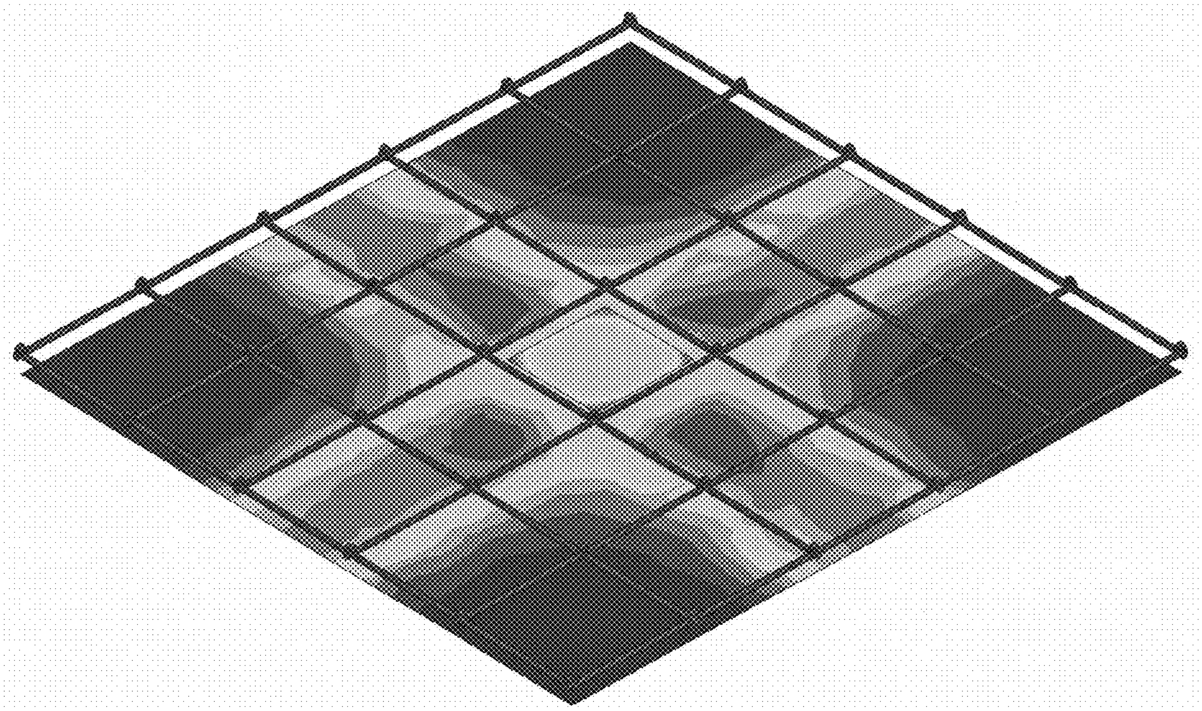

FIGS. 5A and 5B are diagrams for describing one reception part that is disposed on a transmission part according to an embodiment of the present disclosure.

FIG. 5A is a diagram illustrating a case in which one reception part 510 is disposed on one array of a transmission part. FIG. 5B is a diagram illustrating a magnetic flux density when the one reception part 510 is disposed on the one array of the transmission part.

When the one reception part 510 is disposed on the one array of the transmission part, wires 521, 522, 523, and 524 are activated so that a current flows into the wires that surround the corresponding reception part.

The transmission part according to an embodiment of the present disclosure applies a change in the phase of a current that flows into at least one horizontal wire and at least one vertical wire that are intersected in a cross form based on the location of the reception part 510. In this case, a magnetic flux density at the location of a corresponding array of the transmission part where the reception part 510 is disposed is changed in response to a change in the phase of the current.

Figure 6A:
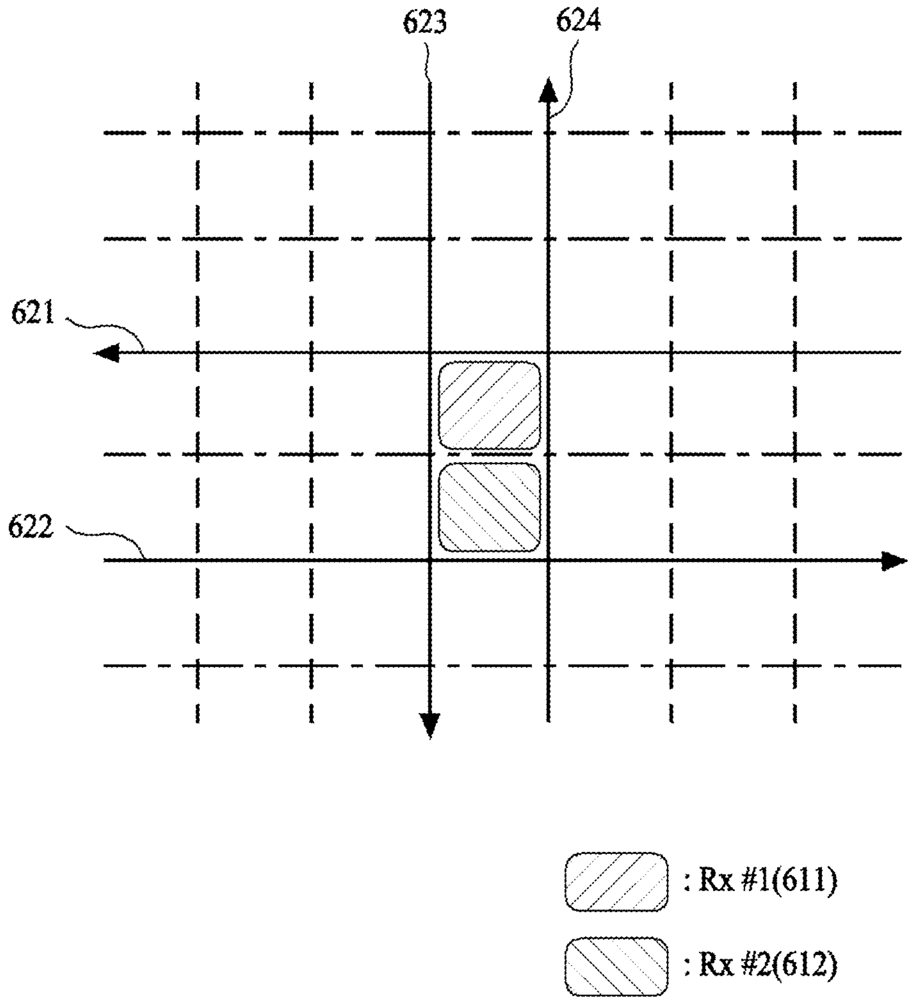
FIGS. 6A and 6B are diagrams for describing a plurality of reception parts that is disposed on a transmission part according to an embodiment of the present disclosure.
Figure 6B:
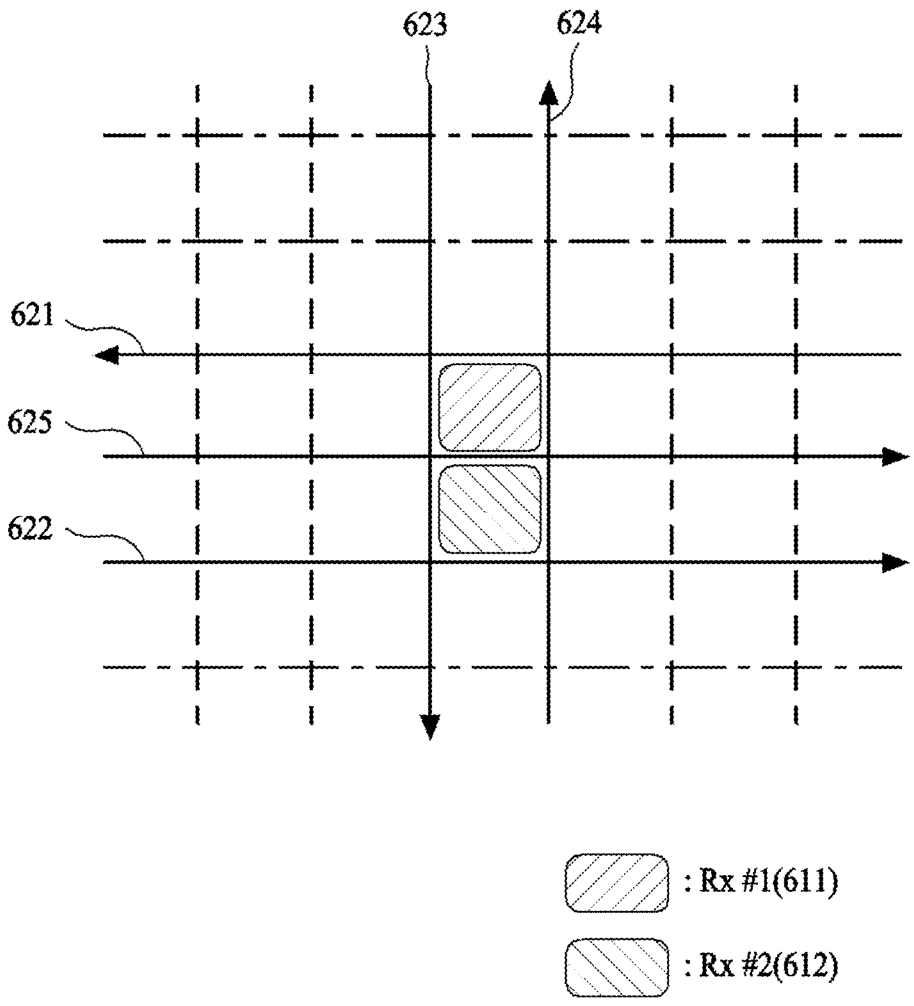

FIGS. 6A and 6B are diagrams for describing a plurality of reception parts that is disposed on a transmission part according to an embodiment of the present disclosure.

FIG. 6A is a diagram illustrating the state in which when two reception parts 611 and 612 are disposed on different arrays of a transmission part, a redundant wire of the arrays has been deactivated so that a current does not flow into the redundant wire. FIG. 6B is a diagram illustrating the state in which when the two reception parts 611 and 612 are disposed on different arrays of the transmission part, the redundant wire has been activated so that a current flows into the redundant wire.

FIG. 6A is a diagram illustrating the state in which when the two reception parts 611 and 612 are disposed on different arrays of the transmission part, wires 621, 622, 623, and 624 that surround the two reception parts 611 and 612 have been activated so that a current flows into the wires and a redundant wire of the arrays has been deactivated so that a current does not flow into the redundant wire.

FIG. 6B is a diagram illustrating the state in which when the two reception parts 611 and 612 are disposed on different arrays of the transmission part, the wires 621, 622, 623, and 624 that surround the two reception parts 611 and 612 have been activated so that a current flows into the wires and a redundant wire 625 of the arrays has been activated so that a current flows into the redundant wire.

The transmission part according to an embodiment of the present disclosure further increases a magnetic flux density by activating the redundant wire 625 so that a current flows into the redundant wire when the two reception parts 611 and 612 are disposed on the different arrays of the transmission part.

Figure 7A:
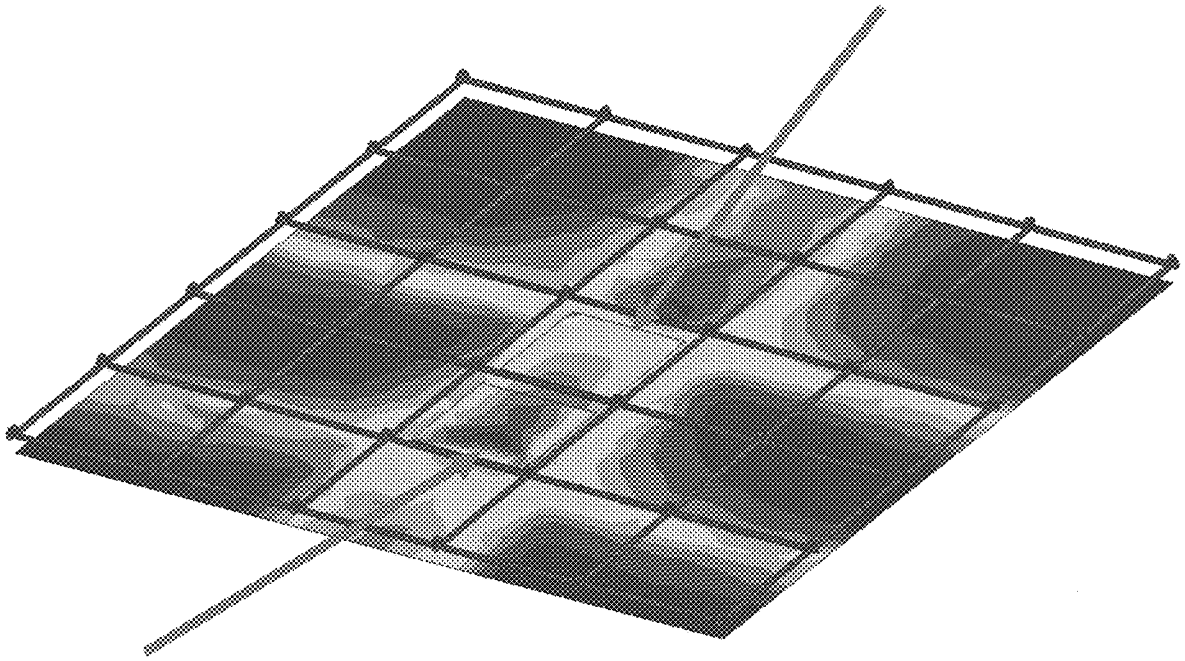
FIGS. 7A and 7B are graphs illustrating a magnetic flux density according to wires that are activated with respect to a plurality of reception parts according to an embodiment of the present disclosure.
Figure 7B:
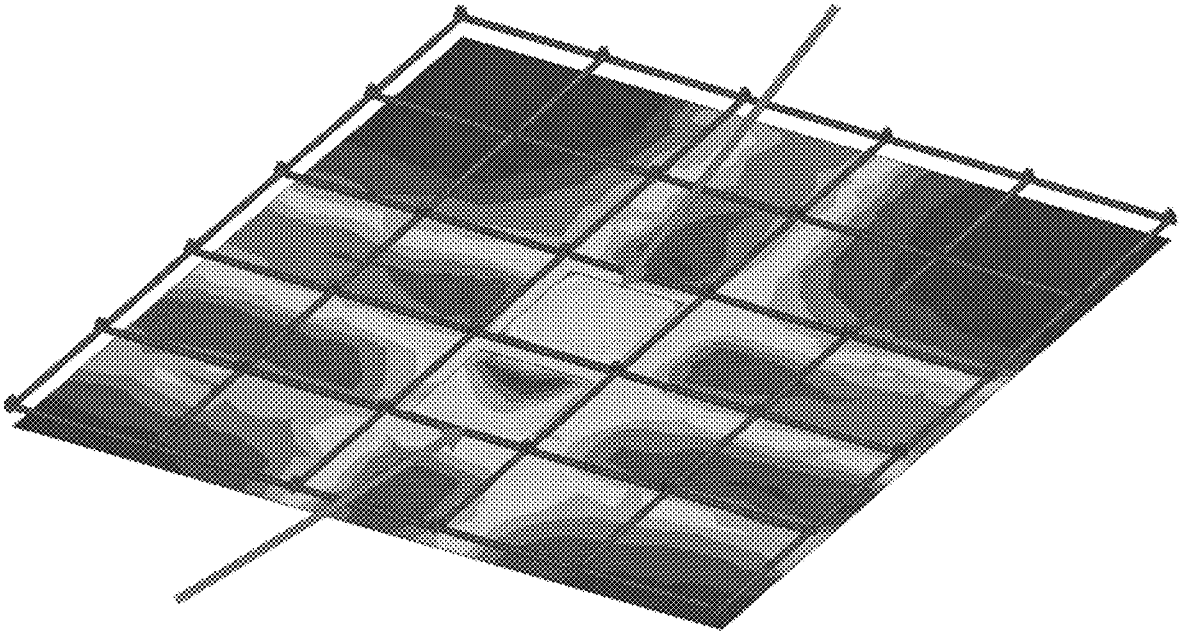

FIGS. 7A and 7B are graphs illustrating a magnetic flux density according to wires that are activated with respect to a plurality of reception parts according to an embodiment of the present disclosure.

FIG. 7A is a diagram illustrating a magnetic flux density in the state in which when two reception parts are disposed on different arrays of a transmission part, a redundant wire has been deactivated so that a current does not flow into the redundant wire. FIG. 7B is a diagram illustrating a magnetic flux density in the state in which when two reception parts are disposed on different arrays of a transmission part, a redundant wire of the arrays has been activated so that a current flows into the redundant wire.

When FIGS. 7A and 7B are compared, it may be seen that when two reception parts are disposed on different arrays of a transmission part, a magnetic flux density is further increased only when a redundant wire of the arrays is activated so that a current flows into the redundant wire.

Figure 8A:
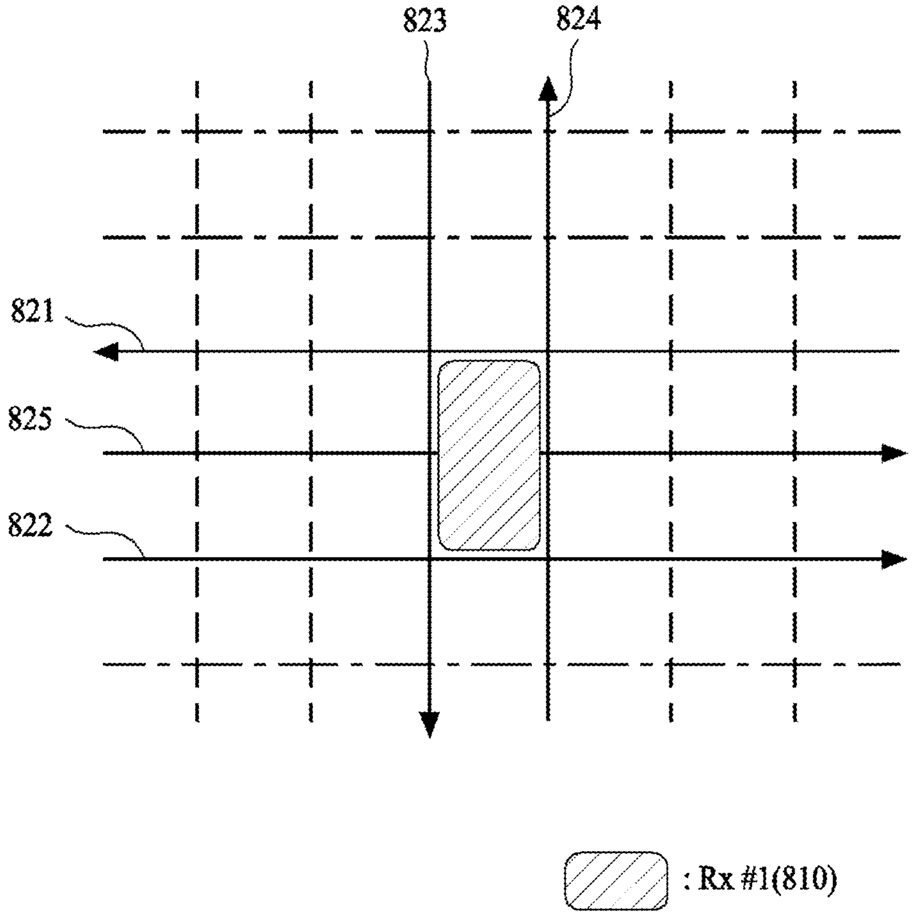
FIGS. 8A and 8B are diagrams for describing a reception part having a large area, which is disposed on a transmission part according to an embodiment of the present disclosure.
Figure 8B:
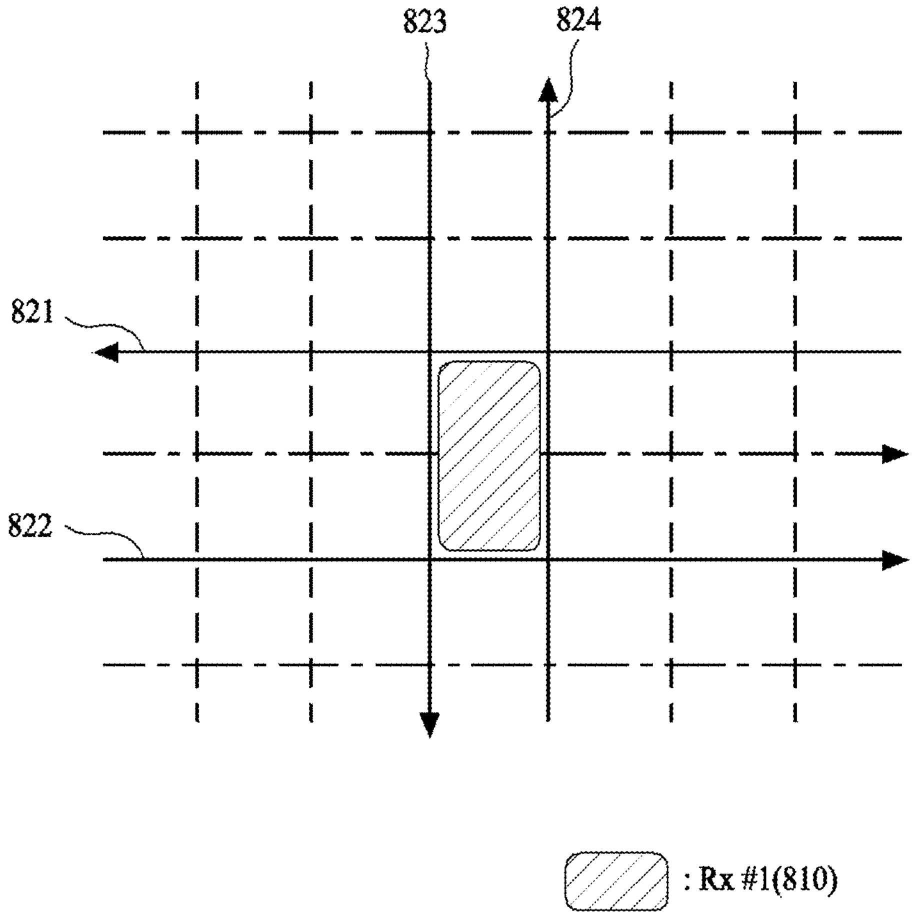

FIGS. 8A and 8B are diagrams for describing a reception part having a large area, which is disposed on a transmission part according to an embodiment of the present disclosure.

The transmission part 111 according to an embodiment of the present disclosure deactivates a wire that is disposed within the area of one reception part so that a current does not flow into the wire when the area of the reception part is greater than the area of one array of the transmission part 111.

FIG. 8A is a diagram illustrating the state in which when the area of one reception part 810 is greater than the area of one array of a transmission part, a wire disposed within the area of the reception part 810 has been activated so that a current flows into the wire. FIG. 8B is a diagram illustrating the state in which when the area of the one reception part 810 is greater than the area of one array of the transmission part, the wire disposed within the area of the reception part 810 has been deactivated so that a current does not flow into the wire.

FIG. 8A is a diagram illustrating the state in which when the area of the one reception part 810 is greater than the area of one array of the transmission part, wires 821, 822, 823, and 824 that surround the reception part 810 have been activated so that a current flows into the wires and a wire 825 disposed within the area of the reception part 810 has been activated so that a current flows into the wire.

FIG. 8B is a diagram illustrating the state in which when the area of the one reception part 810 is greater than the area of one array of the transmission part, the wires 821, 822, 823, and 824 that surround the reception part 810 have been activated so that a current flows into the wires and the wire disposed within the area of the reception part 810 has been deactivated so that a current does not flow into the wire. The transmission part according to an embodiment of the present disclosure further increases a magnetic flux density by deactivating a wire disposed within the area of the reception part 810 so that a current does not flow into the wire when the area of one reception part 810 is greater than the area of one array of a transmission part.

Figure 9A:
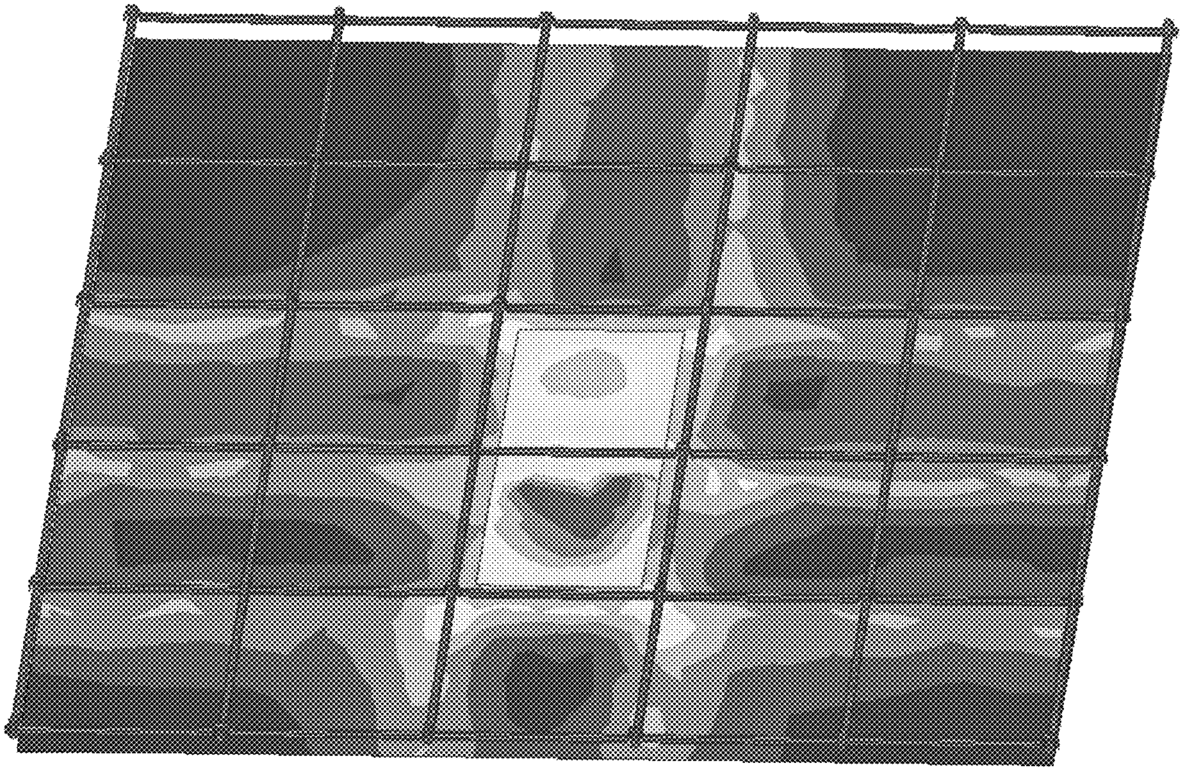
FIGS. 9A and 9B are graphs illustrating a magnetic flux density which is changed according to wires that are activated with respect to a reception part having a large area according to an embodiment of the present disclosure.
Figure 9B:
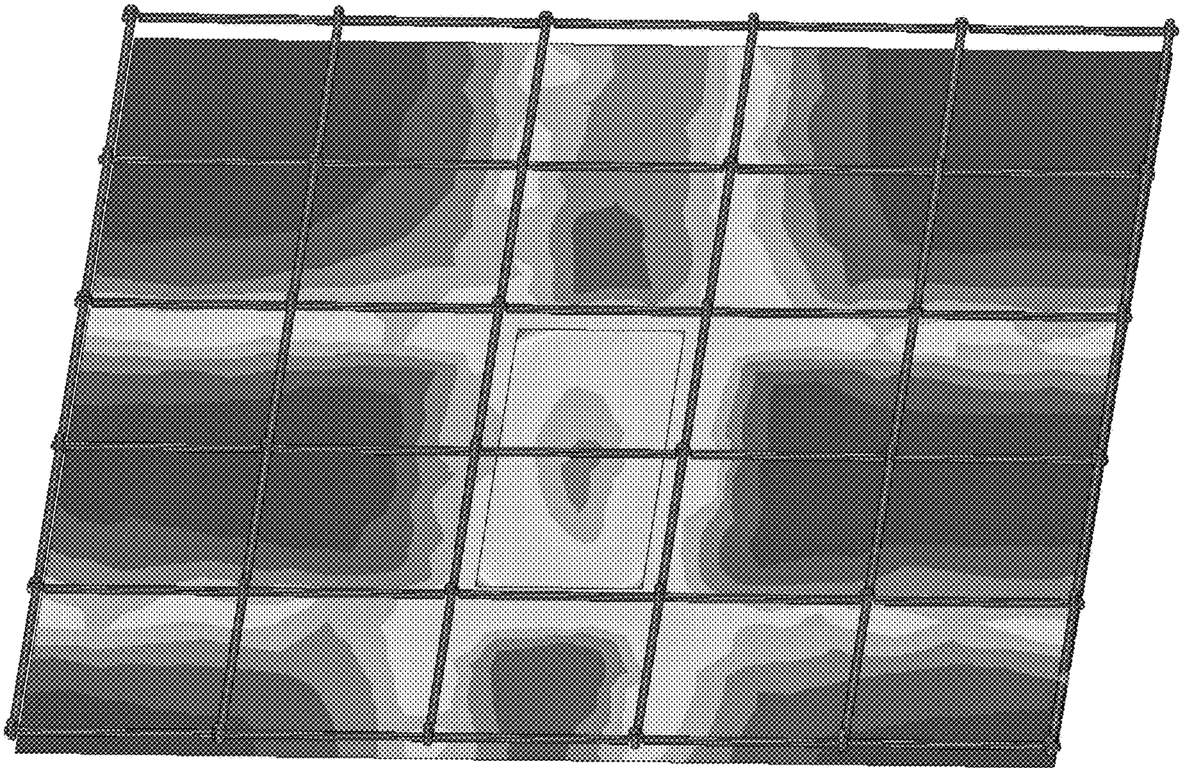

FIGS. 9A and 9B are graphs illustrating a magnetic flux density which is changed according to wires that are activated with respect to a reception part having a large area according to an embodiment of the present disclosure.

FIG. 9A is a diagram illustrating a magnetic flux density in the state in which when the area of one reception part is greater than the area of one array of a transmission part, a wire disposed within the area of the one reception part has been activated so that a current flows into the wire. FIG. 9B is a diagram illustrating a magnetic flux density in the state in which when the area of one reception part is greater than the area of one array of a transmission part, a wire disposed within the area of the one reception part has been deactivated so that a current does not flow into the wire.

When FIGS. 9A and 9B are compared, it may be seen that when the area of one reception part is greater than the area of one array of a transmission part, a magnetic flux density is further increased only when a wire disposed within the area of the one reception part is deactivated so that a current does not flow into the wire.

The aforementioned apparatus may be implemented as a hardware component, a software component, and/or a combination of a hardware component and a software component. For example, the apparatus and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other apparatus capable of executing or responding to an instruction. The processing apparatus may perform an operating system (OS) and one or more software applications that are executed on the OS. Furthermore, the processing apparatus may access, store, manipulate, process, and generate data in response to the execution of software. For convenience of understanding, one processing apparatus has been illustrated as being used, but a person having ordinary knowledge in the art may understand that the processing apparatus may include a plurality of processing elements and/or a plurality of types of processing elements. For example, the processing apparatus may include a plurality of processors or one processor and one controller. Furthermore, another processing configuration, such as a parallel processor, is also possible.

Software may include a computer program, a code, an instruction or a combination of one or more of them, and may configure a processing apparatus so that the processing apparatus operates as desired or may instruct the processing apparatuses independently or collectively. The software and/or the data may be embodied in any type of machine, a component, a physical apparatus, virtual equipment, or a computer storage medium or apparatus in order to be interpreted by the processing apparatus or to provide an instruction or data to the processing apparatus. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk, and a magnetic tape, optical media such as CD-ROM and a DVD, magneto-optical media such as a floptical disk, and hardware devices specially configured to store and execute a program instruction, such as ROM, RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art May modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A contactless charging system comprising:

a transmission part having a plurality of horizontal wires and a plurality of vertical wires, each of the plurality of horizontal wires and each of the plurality of vertical wires intersected in a cross form and disposed in an array form and not having a coil; and at least one reception part comprising a coil that is disposed on the transmission part and for receiving a change in a magnetic field according to a location of an array of the transmission part, wherein the at least one reception part is freely movable within the array of the transmission part;

a sensor part for recognizing the location of the array of the transmission part where the reception part is disposed;

at least one non-transitory memory unit having an operating system with execution instructions, wherein executed execution instructions activate or deactivate at least a portion of the array of the transmission part; and at least one processor connected to the non-transitory memory, wherein the processor is in electrical communication with the transmission part and the sensor part, the processor configured to execute the execution instructions, wherein the execution instructions are received from the operating system, wherein the transmission part receives the executed execution instructions from the at least one processor to deactivate at least one of a horizontal wire or vertical wire of the plurality of horizontal wires and vertical wires, respectively, the at least one horizontal wire or vertical wire of the plurality of horizontal wires and vertical wires disposed within an area of one reception part so that a current does not flow into the wire when the area of the one reception part is greater than an area of one array of the transmission part; and wherein the transmission part applies a change in a phase of a current that flows into the at least one horizontal wire of the plurality of horizontal wires and the at least one vertical wire of the plurality of vertical wires that are intersected in the cross form based on a location of the reception part.

2. The contactless charging system of claim 1, wherein a magnetic flux density at a location of a corresponding array of the transmission part wherein the reception part is disposed is changed in response to a change in the phase of the current.

3. The contactless charging system of claim 2, wherein the transmission part adjusts a magnetic flux density at a location of a desired array through reinforcement interference between the at least one horizontal wire of the plurality of horizontal wires and the at least one vertical wire of the plurality of vertical wires without an additional wire.

4. The contactless charging system of claim 1, wherein if two or more reception parts are disposed on the transmission part, when the two or more reception parts are disposed on different arrays of the transmission part and the different arrays are adjacent to each other, the transmission part activate a redundant wire of the arrays that are adjacent to each other so that a current flows into the redundant wire.

5. The contactless charging system of claim 1, wherein the sensor part recognizes whether an object is present on the transmission part, recognizes whether the corresponding object is a reception part comprising a coil when the object is present on the transmission part, and recognizes a location of an array of the transmission part where the corresponding reception part is disposed when the object is the reception part so that the transmission part performs wireless power transfer (WPT).

6. The contactless charging system of claim 1, wherein when two or more reception parts are disposed on the transmission part, the sensor part recognizes a number of reception parts and a location of each of the reception parts so that the transmission part performs the WPT.

7. A contactless charging method comprising:

recognizing, by a sensor part, whether an object is present on a transmission part, the transmission part having a plurality of horizontal wires and a plurality of vertical wires, each of the plurality of horizontal wires and each of the plurality of vertical wires intersected in a cross form and disposed in an array form and not having a coil;

recognizing, by the sensor part, whether the object is a reception part comprising a coil when the corresponding object is present on the transmission part;

recognizing, by the sensor part, a number of corresponding reception parts when the object is the reception part, wherein the at least one reception part is feely movable within the array of the transmission part;

recognizing, by the sensor part, a location of an array of the transmission part where each of the reception parts is disposed so that the transmission part performs wireless power transfer (WPT); and deactivating, by a processor connected to a non-transitory memory unit having an operating system with execution instructions, at least a portion of the array of the transmission part, wherein the processor is in electrical communication with the transmission part and the sensor part, wherein the execution instructions are received by the processor and are executed, wherein the transmission part receives the executed execution instructions to deactivate at least two horizontal wires or two vertical wires of the plurality of horizontal wires and vertical wires, respectively, the at least two horizontal wires or the two vertical wires of the plurality of horizontal wires and vertical wires disposed within an area of each of the reception parts so that a current does not flow into each of the wires when the area of each of the reception parts is greater than an area of each array of the transmission part; and wherein recognizing, by the sensor part, a location of an array of the transmission part where each of the reception parts is disposed so that the transmission part performs WPT comprises applying, by the transmission part, a change in a phase of a current that flows into the at least two horizontal wires of the plurality of horizontal wires and the at least two vertical wires of the plurality of vertical wires that are intersected in the cross form based on a location of the reception part.

8. The contactless charging method of claim 7, wherein in recognizing, by the sensor part, a location of an array of the transmission part where each of the reception parts is disposed so that the transmission part performs WPT, a magnetic flux density at a location of a corresponding array of the transmission part wherein the reception part is disposed is changed in response to a change in the phase of the current.

9. The contactless charging method of claim 8, wherein in recognizing, by the sensor part, a location of an array of the transmission part where each of the reception parts is disposed so that the transmission part performs WPT, a magnetic flux density at a location of a desired array is adjusted through reinforcement interference between the at least two horizontal wires of the plurality of horizontal wires and the at least two vertical wires of the plurality of vertical wires without an additional wire.

10. The contactless charging method of claim 7, wherein in recognizing, by the sensor part, a location of an array of the transmission part where each of the reception parts is disposed so that the transmission part performs WPT, if two or more reception parts are disposed on the transmission part, when the two or more reception parts are disposed on different arrays of the transmission part and the different arrays are adjacent to each other, a redundant wire of the arrays that are adjacent to each other is activated so that a current flows into the redundant wire.

11. A contactless charging system comprising:

a transmission part having a plurality of horizontal wires and a plurality of vertical wires, each of the plurality of horizontal wires and each of the plurality of vertical wires intersected in a cross form and disposed in an array form and not having a coil; and at least one reception part comprising a coil that is disposed on the transmission part and for receiving a change in a magnetic field according to a location of an array of the transmission part, wherein the at least one reception part is freely movable within the array of the transmission part;

a sensor part for recognizing the location of the array of the transmission part where the reception part is disposed; wherein the sensor part:

recognizes whether an object is present on the transmission part, recognizes whether the corresponding object is a reception part comprising a coil when the object is present on the transmission part, recognizes a location of an array of the transmission part where the corresponding reception part is disposed when the object is the reception part so that the transmission part performs wireless power transfer (WPT); and recognizes the number of corresponding reception parts;

at least one non-transitory memory unit having an operating system with execution instructions, wherein executed execution instructions activate or deactivate at least a portion of the array of the transmission part;

at least one processor connected to the non-transitory memory, wherein the processor is in electrical communication with the transmission part and the sensor part, the processor configured to execute the execution instructions, wherein the execution instructions are received from the operating system, wherein the transmission part receives the executed execution instructions from the at least one processor to deactivate at least one of a horizontal wire or vertical wire of the plurality of horizontal wires and vertical wires, respectively, the at least one horizontal wire or vertical wire of the plurality of horizontal wires and vertical wires disposed within an area of one reception part so that a current does not flow into the wire when the area of the one reception part is greater than an area of one array of the transmission part;

wherein the transmission part applies a change in a phase of a current that flows into the at least one horizontal wire of the plurality of horizontal wires and the at least one vertical wire of the plurality of vertical wires that are intersected in the cross form based on a location of the reception part;

wherein if two or more reception parts are disposed on the transmission part, when the two or more reception parts are disposed on different arrays of the transmission part and the different arrays are adjacent to each other, the transmission part activate a redundant wire of the arrays that are adjacent to each other so that a current flows into the redundant wire and a magnetic flux within each of the different arrays covers substantially more of an area of the different arrays than when the redundant wire is not activated; and wherein when the area of the one reception part is greater than the area of one array of the transmission part, the magnetic flux covers substantially more area of the reception part when the redundant wire does not have a current.

* * * * *